United States Patent
Cummins et al.

(10) Patent No.: US 9,508,096 B2
(45) Date of Patent: Nov. 29, 2016

(54) METHOD AND SYSTEM FOR CREATING AND PROCESSING PERSONALIZED GIFT CARDS

(71) Applicant: Orbis Patents, Ltd., Blackrock (IE)

(72) Inventors: Oran Cummins, Dublin (IE); Stephen Doyle, Castleknock (IE)

(73) Assignee: ORBIS PATENTS LIMITED, Dublin (IE)

( * ) Notice: Subject to any disclaimer, the term of this patent is extended or adjusted under 35 U.S.C. 154(b) by 411 days.

(21) Appl. No.: 13/791,122

(22) Filed: Mar. 8, 2013

(65) Prior Publication Data

US 2014/0258019 A1    Sep. 11, 2014

(51) Int. Cl.
*G06Q 30/00* (2012.01)
*G06Q 30/06* (2012.01)

(52) U.S. Cl.
CPC ................. *G06Q 30/0621* (2013.01)

(58) Field of Classification Search
CPC .............................................. G06Q 30/0621
USPC .......................................................... 705/26.5
See application file for complete search history.

(56) References Cited

U.S. PATENT DOCUMENTS

| | | | |
|---|---|---|---|
| 6,173,269 B1 | 1/2001 | Solokl et al. | |
| 6,282,522 B1 | 8/2001 | Davis et al. | |
| 6,970,837 B1 | 11/2005 | Walker et al. | |
| 7,711,620 B2 * | 5/2010 | Abifaker | 705/35 |
| 8,036,944 B2 * | 10/2011 | Lee | G06Q 30/02 |
| | | | 705/26.1 |
| 8,046,266 B1 * | 10/2011 | Geller et al. | 705/26.1 |
| 8,046,268 B2 * | 10/2011 | Hunt | G06Q 20/102 |
| | | | 705/26.1 |

(Continued)

FOREIGN PATENT DOCUMENTS

| JP | 10143572 A1 | 5/1998 |
|---|---|---|
| WO | 9526536 A1 | 10/1995 |

(Continued)

OTHER PUBLICATIONS

U.S. Appl. No. 60/083,004, filed by Blagg et al. on Apr. 24, 1998.*

(Continued)

*Primary Examiner* — Nicholas D Rosen
(74) *Attorney, Agent, or Firm* — Buchanan Ingersoll & Rooney PC

(57) ABSTRACT

A method for processing a personalized gift card transaction includes: receiving a gift card request from a consumer associated with a payment account, the request including a usage amount, a plurality of merchant identifiers, an account identifier associated with the payment account, and a message; identifying a personalized gift card number; storing a gift card data entry including the personalized gift card number, usage amount, plurality of merchant identifiers, account identifier, and message; transmitting the personalized gift card number; receiving an authorization request for a financial transaction not involving the consumer, the request including the personalized gift card number, a transaction amount, and at least one merchant identifier of the plurality of merchant identifiers; processing the financial transaction including updating, in the database, the usage amount of the gift card data entry based on the transaction amount; and transmitting the message to a recipient of the personalized gift card.

30 Claims, 9 Drawing Sheets

(56) References Cited

U.S. PATENT DOCUMENTS

| | | | |
|---|---|---|---|
| 8,442,866 B2* | 5/2013 | Stone et al. | 705/26.1 |
| 8,463,674 B2* | 6/2013 | Hurst | 705/35 |
| 2002/0198806 A1 | 12/2002 | Blagg et al. | |
| 2005/0027617 A1 | 2/2005 | Zucker et al. | |
| 2006/0190332 A1* | 8/2006 | Grider | 705/14 |
| 2006/0218038 A1* | 9/2006 | Grider | 705/14 |
| 2008/0052164 A1* | 2/2008 | Abifaker | 705/14 |
| 2008/0091582 A1 | 4/2008 | Blagg et al. | |
| 2009/0171804 A1* | 7/2009 | Lee | G06Q 30/02 705/26.1 |
| 2009/0179074 A1* | 7/2009 | Hurst | 235/380 |
| 2010/0010918 A1* | 1/2010 | Hunt | G06Q 20/102 705/26.1 |
| 2010/0280921 A1* | 11/2010 | Stone et al. | 705/27 |
| 2011/0153462 A1* | 6/2011 | Granich | 705/27.1 |
| 2012/0109787 A1* | 5/2012 | Larrick et al. | 705/27.1 |
| 2012/0150611 A1* | 6/2012 | Isaacson et al. | 705/14.27 |
| 2012/0191513 A1* | 7/2012 | Ocher | 705/14.1 |
| 2013/0151401 A1* | 6/2013 | Scipioni | G06Q 20/348 705/39 |

FOREIGN PATENT DOCUMENTS

| | | |
|---|---|---|
| WO | 0002150 A1 | 1/2000 |
| WO | WO-2011/113141 A1 * | 9/2011 |
| WO | WO-2012/082831 A1 * | 6/2012 |

OTHER PUBLICATIONS

Anon., "Gift Check Solutions Announces New Gift Card Program for Retailers and Restauranteurs," PR Newswire, Jul. 28, 2000.*

Anon., "Mercury Payment Systems' Free Gift Card Processing Gives Retailers Affordable Gift Card Solution; Added Value Drives Rapid Growth of Company's Gift Card Program," Busienss Wire, Oct. 26, 2005.*

Anon., "Buckhead Life Restaurant Group Joins Growing List of SWAGG Merchants:—SWAGG Gift to Be Available in Outlier's Hometown of Atlanta," PR Newswire, Dec. 3, 2010.*

* cited by examiner

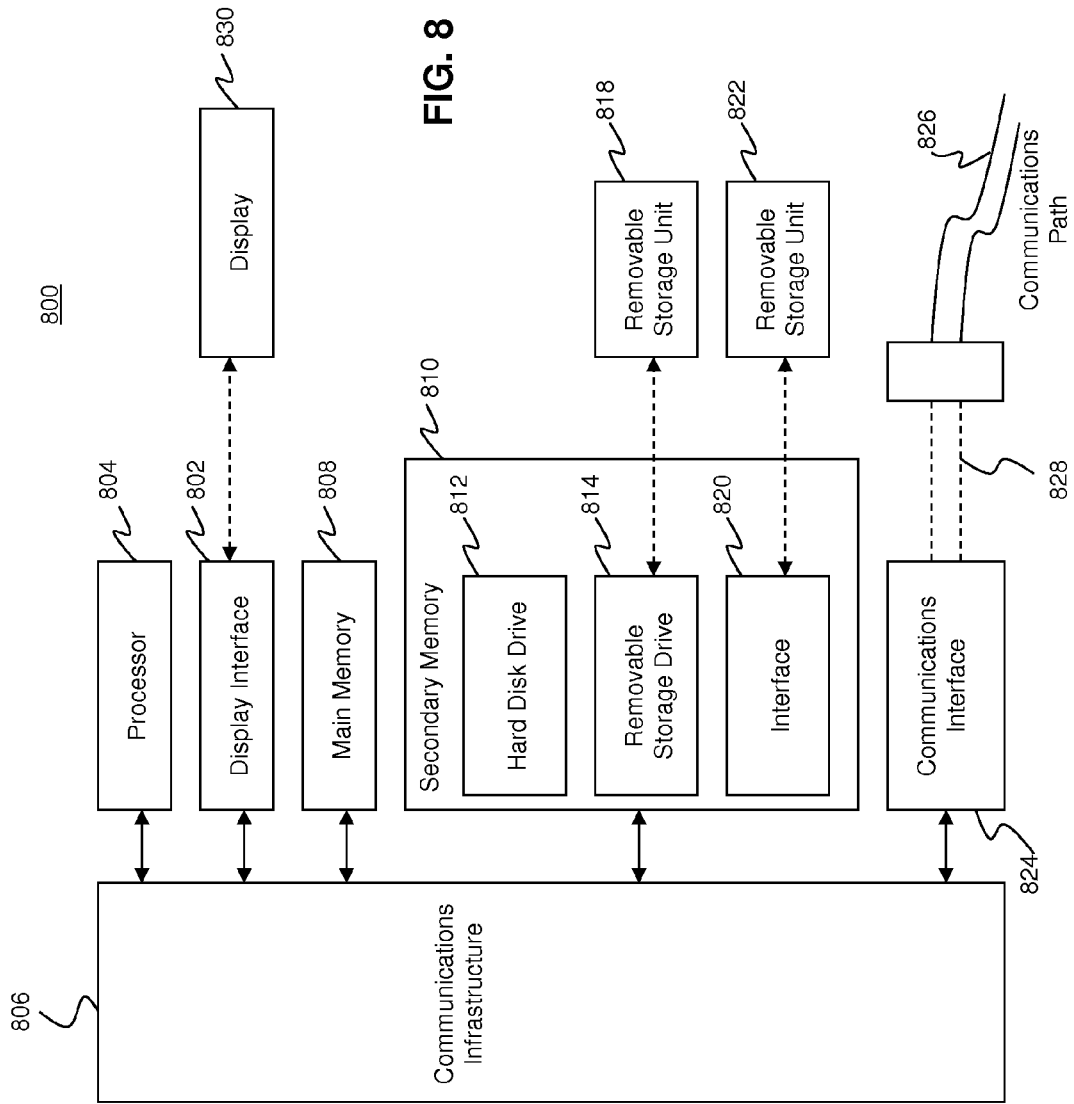

METHOD AND SYSTEM FOR CREATING AND PROCESSING PERSONALIZED GIFT CARDS

FIELD

The present disclosure relates to the creation and processing of personalized gift cards, specifically the creation of gift cards redeemable at selected merchants and including personalized images or a personalized message to be displayed upon redemption.

BACKGROUND

Consumers often purchase gift cards to give to a recipient in place of a traditional gift. In some instances, consumers may give a gift card when they are at a loss as to what gift to give the recipient. A gift card allows a recipient to select the ideal gift that they want, without the need for the consumer to select a gift and hope it is what the recipient would have selected themselves. While the giving of a gift card may be beneficial for recipients, many people believe that gift cards sometimes indicate that the giver of the gift card either does not know the recipient well enough to select the ideal gift, or that the giver did not take the time or effort to find a more suitable gift.

Thus, there is a need for a technical solution to provide consumers with the ability to create a more personalized gift card, which may allow for a recipient to select their own gift, but still provide the consumer with the ability to convey that they took effort in the selection and personalization of the gift card.

SUMMARY

The present disclosure provides a description of a systems and methods for the processing of a personalized gift card transaction.

A method for processing a personalized gift card transaction includes: receiving, by a receiving device, a gift card request from a consumer associated with a payment account, wherein the request includes at least a usage amount, a plurality of merchant identifiers, an account identifier associated with the payment account, and a message; identifying, by a processing device, a personalized gift card number; storing, in a database, a gift card data entry including data related to a personalized gift card and including the personalized gift card number, the usage amount, the plurality of merchant identifiers, the account identifier, and the message; transmitting, by a transmitting device, at least the personalized gift card number; receiving, by the receiving device, an authorization request for a financial transaction not involving the consumer, wherein the authorization request includes at least the personalized gift card number, a transaction amount, and at least one merchant identifier of the plurality of merchant identifiers; processing, by the processing device, the financial transaction, wherein processing the financial transaction includes updating, in the database, the usage amount of the gift card data entry based on the transaction amount; and transmitting, by the transmitting device, the message to a recipient of the personalized gift card.

A method for processing a personalized gift card transaction includes: receiving, by a receiving device, a gift card request from a consumer associated with a payment account, wherein the request includes at least a usage amount, a plurality of merchant identifiers, an account identifier associated with the payment account, and at least one image; identifying, by a processing device, a personalized gift card number; storing, in a database, a gift card data entry including data related to a personalized gift card and including the personalized gift card number, the usage amount, the plurality of merchant identifiers, the account identifier, and the at least one image; distributing, by a distribution device, the personalized gift card, wherein the personalized gift card displays the at least one image; receiving, by the receiving device, an authorization request for a financial transaction not involving the consumer, wherein the authorization request includes at least the personalized gift card number, a transaction amount, and at least one merchant identifier of the plurality of merchant identifiers; and processing, by the processing device, the financial transaction, wherein processing the financial transaction includes updating, in the database, the usage amount of the gift card data entry based on the transaction amount.

A system for processing a personalized gift card transaction includes a receiving device, a processing device, a database, and a transmitting device. The receiving device is configured to receive a gift card request from a consumer associated with a payment account, wherein the request includes at least a usage amount, a plurality of merchant identifiers, an account identifier associated with the payment account, and a message. The processing device is configured to identify a personalized gift card number. The database is configured to store a gift card data entry including data related to a personalized gift card and including the personalized gift card number, the usage amount, the plurality of merchant identifiers, the account identifier, and the message. The transmitting device is configured to transmit at least the personalized gift card number. The receiving device is further configured to receive an authorization request for a financial transaction not involving the consumer, wherein the authorization request includes at least the personalized gift card number, a transaction amount, and at least one merchant identifier of the plurality of merchant identifiers. The processing device is further configured to process the financial transaction, wherein processing the financial transaction includes updating, in the database, the usage amount of the gift card data entry based on the transaction amount. The transmitting device is further configured to transmit the message to a recipient of the personalized gift card.

A system for processing a personalized gift card transaction includes a receiving device, a processing device, a database, and a distribution device. The receiving device is configured to receive a gift card request from a consumer associated with a payment account, wherein the request includes at least a usage amount, a plurality of merchant identifiers, an account identifier associated with the payment account, and at least one image. The processing device is configured to identify a personalized gift card number. The database is configured to store a gift card data entry including data related to a personalized gift card and including the personalized gift card number, the usage amount, the plurality of merchant identifiers, the account identifier, and the at least one image. The distribution device is configured to distribute the personalized gift card, wherein the personalized gift card displays the at least one image. The receiving device is further configured to receive an authorization request for a financial transaction not involving the consumer, wherein the authorization request includes at least the personalized gift card number, a transaction amount, and at least one merchant identifier of the plurality of merchant identifiers. The processing device is further configured to process the financial transaction, wherein processing the financial transaction includes updating, in the database, the usage amount of the gift card data entry based on the transaction amount.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 8 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include gift cards, personalized gift cards, payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

System for Distributing and Processing Personalized Gift Cards

Figure 1:
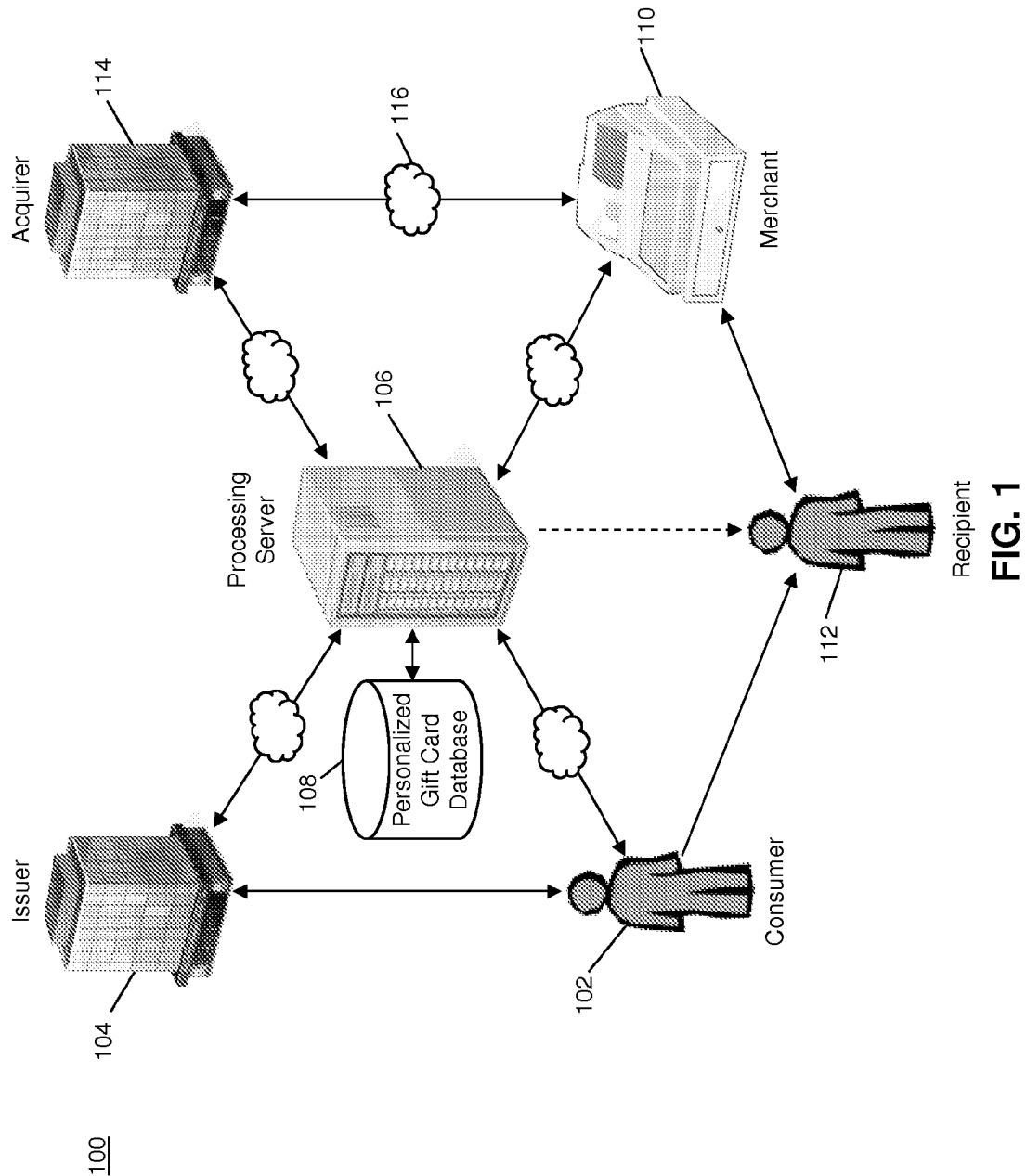
FIG. 1 is a is a high level architecture illustrating a system for the distribution and processing of personalized gift cards in accordance with exemplary embodiments.

FIG. 1 is a block diagram illustrating a system 100 for distributing and processing personalized gift cards.

A consumer 102 may have a payment account with an issuer 104, such as a credit card account, or the consumer 102 can use a payment account from a different issuer or other funding source (e.g., cash, check, credit or debit card, electronic transfer, etc.). The issuer 104 may be a bank or any other financial institution configured to issue accounts to consumers, such as the consumer 102. The consumer 102 may communicate with a processing server 106 in order to personalize a gift card. The consumer 102 may communication with the processing server 106 via a network 116, such as the Internet.

The consumer 102 may submit a personalized gift card request, discussed in more detail below, to the processing server 106. In some embodiments, the consumer 102 may submit the request via telephone, an application program on a mobile communication device (e.g., a smartphone, tablet computer, etc.), a webpage hosted by or on behalf of the processing server 106, etc. Methods for submitting personalized gift card requests to the processing server 106 will be apparent to persons having skill in the relevant art. In some embodiments, the personalized gift card request may include at least a personalized message or at least one image to be displayed by the personalized gift card.

The processing server 106 may identify a personalized gift card number and may create and store, in a personalized gift card database 108, a gift card data entry including data related to the personalized gift card, as discussed in more detail below. The processing server 106 may distribute the personalized gift card to the consumer 102. In some embodiments, the personalized gift card may be an electronic or virtual gift card. In other embodiments, the personalized gift card may be a physical gift card. In some instances, the personalized gift card may be distributed directly to a recipient 112 by the processing server 106. In other instances, the consumer 102 may receive the personalized gift card for gifting to the recipient 112.

An electronic personalized gift card may be distributed to the consumer 102 or the recipient 112 via e-mail, short message service (SMS) message, multimedia message service (MMS) message, an application program, or any other method suitable for the distribution of an electronic gift card as will be apparent to persons having skill in the relevant art. In some embodiments, the electronic personalized gift card may be illustrated in an image depicting the electronic personalized gift card, which may include, for example, the recipient's 112 name, the personalized gift card number, the gift card balance, and at least one image if selected by the consumer 102.

The recipient 112 may receive the personalized gift card and may initiate a financial transaction using the personalized gift card at an eligible merchant 110. As discussed in more detail below, the merchant 110 may be one of a plurality of merchants indicated for redemption of the personalized gift card. The merchant 110 may enter transaction information, including personalized gift card details, into a point-of-sale and may submit an authorization request for the financial transaction. In some embodiments, the authorization request may be submitted (e.g., via the network 116) to the processing server 106. In other embodiments, the transaction details and/or authorization request may be transmitted to an acquirer 114, such as an acquiring bank, which may then submit an authorization request to the processing server 106.

The processing server 106 may be part of a payment network configured to processing financial transactions. The processing server 106, or another entity in the payment network, may process the financial transaction using methods apparent to persons having skill in the relevant art. The processing server 106 may submit an authorization response, following processing of the transaction, to the merchant 110 and/or the acquirer 114. The merchant 110 may then finalize the transaction with the recipient 112. In some embodiments, the processing server 106 may (e.g., via the issuer 104) place a hold on the payment account associated with the consumer 102 for the amount of the personalized gift card. The payment account may then be used to fund the financial transaction(s) initiated by the recipient when using the personalized gift card for up to the amount of the card. In other embodiments, the amount of the personalized gift card may be deducted from the payment account when the personalized gift card is created.

Processing Server

Figure 2:
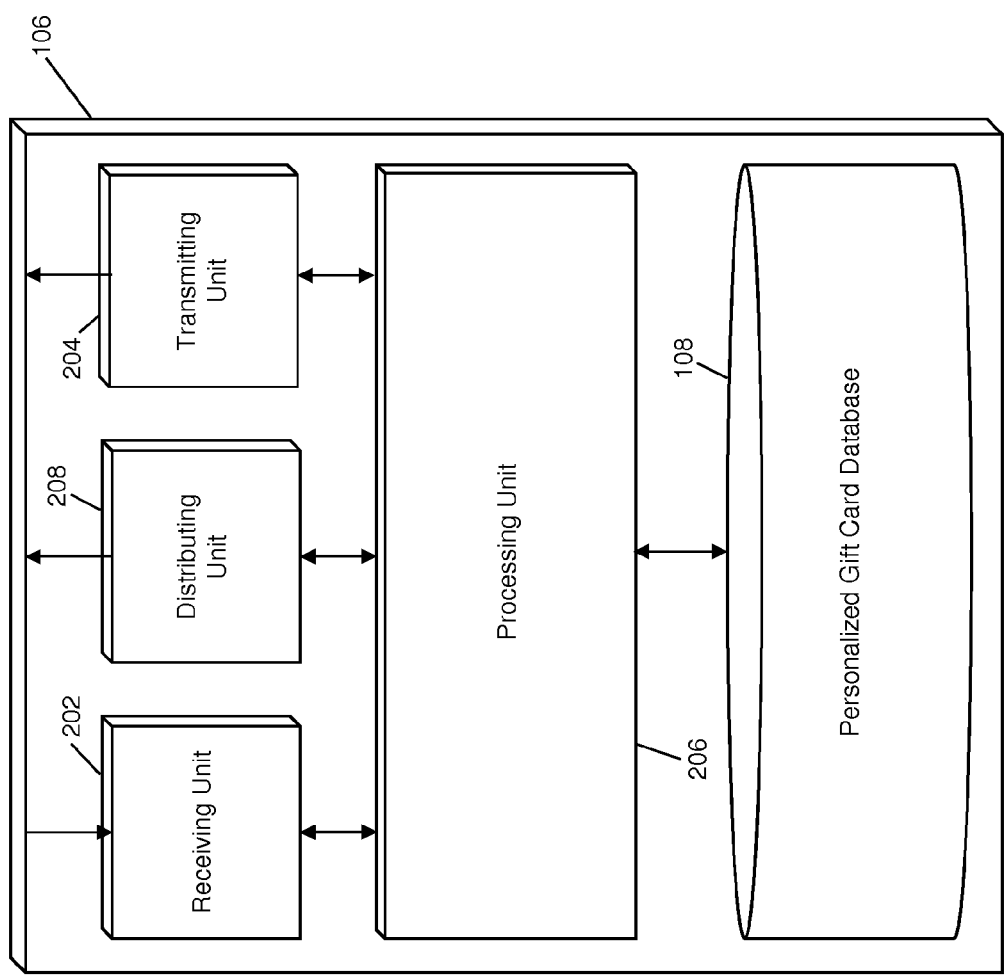
FIG. 2 is a block diagram illustrating an embodiment of a processing server for use in the system of FIG. 1 in accordance with exemplary embodiments.

FIG. 2 illustrates an embodiment of the processing server 106 of the system 100. It will be apparent to persons having skill in the relevant art that the embodiment of the processing server 106 illustrated in FIG. 2 is provided as illustration only and may not be exhaustive to all possible configurations of the processing server 106 suitable for performing the functions as discussed herein. For example, the computer system 800 illustrated in FIG. 8 and discussed in more detail below may be a suitable configuration of the processing server 106. The processing server 106 may include a receiving unit 202. The receiving unit 202 may be configured to receive (e.g., via the network 116) a personalized gift card request, such as from the consumer 102. The personalized gift card request may include at least a usage amount, a plurality of merchant identifiers, and an account identifier. In some embodiments, the personalized gift card request may further include a personalized message and/or at least one image to be displayed on the personalized gift card.

The processing server 106 may also include a processing unit 206. The processing unit 206 may be configured to identify a personalized gift card number. The personalized gift card number may be a unique value used to identify a specific personalized gift card. The processing server 106 may be further configured to store, in the personalized gift card database, a gift card data entry including the personalized gift card number and the information included in the received personalized gift card request. The gift card data entry and data included therein are discussed in more detail below with respect to FIG. 3.

The processing server 106 may further include a transmitting unit 204 and a distributing unit 208. Each of the transmitting unit 204 and the distributing unit 208 may be configured to transmit and/or distribute the personalized gift card to the consumer 102 and/or the recipient 112. For example, the transmitting unit 204 may be configured to transmit (e.g., via e-mail, SMS message, an application program, etc.) an electronic personalized gift card to the recipient 112, and the distributing unit 208 may be configured to print (e.g., produce) a physical personalized gift card for distribution (e.g., via traditional mail) to the recipient 112. In one embodiment, the personalized gift card may be distributed in a form and to a destination identified by the consumer 102, such as in the personalized gift card request. In embodiments where the personalized gift card request may include at least one image, the personalized gift card may be transmitted or distributed including the at least one image.

The receiving unit 202 may be further configured to receive an authorization request for a financial transaction involving the personalized gift card. The authorization request may include at least the personalized gift card number, a transaction amount, and at least one merchant identifier (e.g., corresponding to the merchant 110) of the plurality of merchant identifiers associated with the personalized gift card in the gift card data entry. The processing unit 206 may process the financial transaction using methods that will be apparent to persons having skill in the relevant art. Processing the financial transaction may include updating, in the personalized gift card database 108, the usage amount in the gift card data entry based on the transaction amount. In some embodiments, processing the financial transaction may include transmitting (e.g., via the transmitting unit 204) transaction details to the issuer 104 and receiving (e.g., via the receiving unit 202) corresponding information, such as in instances where the personalized gift card may be associated with a payment account associated with the consumer 102 and not funded prior to its use.

The processing unit 206 may be configured to cause the transmitting unit 204 to transmit an authorization response to the merchant 110 and/or the acquirer 114 based on the processing of the financial transaction. In embodiments where the personalized gift card request may include a personalized message, the transmitting unit 204 may be configured to transmit the personalized message to the recipient 112. In a further embodiment, the personalized message may be included in the authorization response for printing on a receipt presented to the recipient 112 by the merchant 110 during finalization of the financial transaction. Additional methods for transmitting the personalized message to the recipient 112 will be apparent to persons having skill in the relevant art, and may include transmitting the personalized message via a method or to a destination address specified by the consumer 102 in the personalized gift card request (e.g., via SMS message to a provided telephone number, etc.). In certain embodiments the recipient 112 may be given the option to send a message or a reply message to the consumer 102 to acknowledge or re-acknowledge, e.g., gratitude for the gift.

Personalized Gift Card Database

Figure 3:
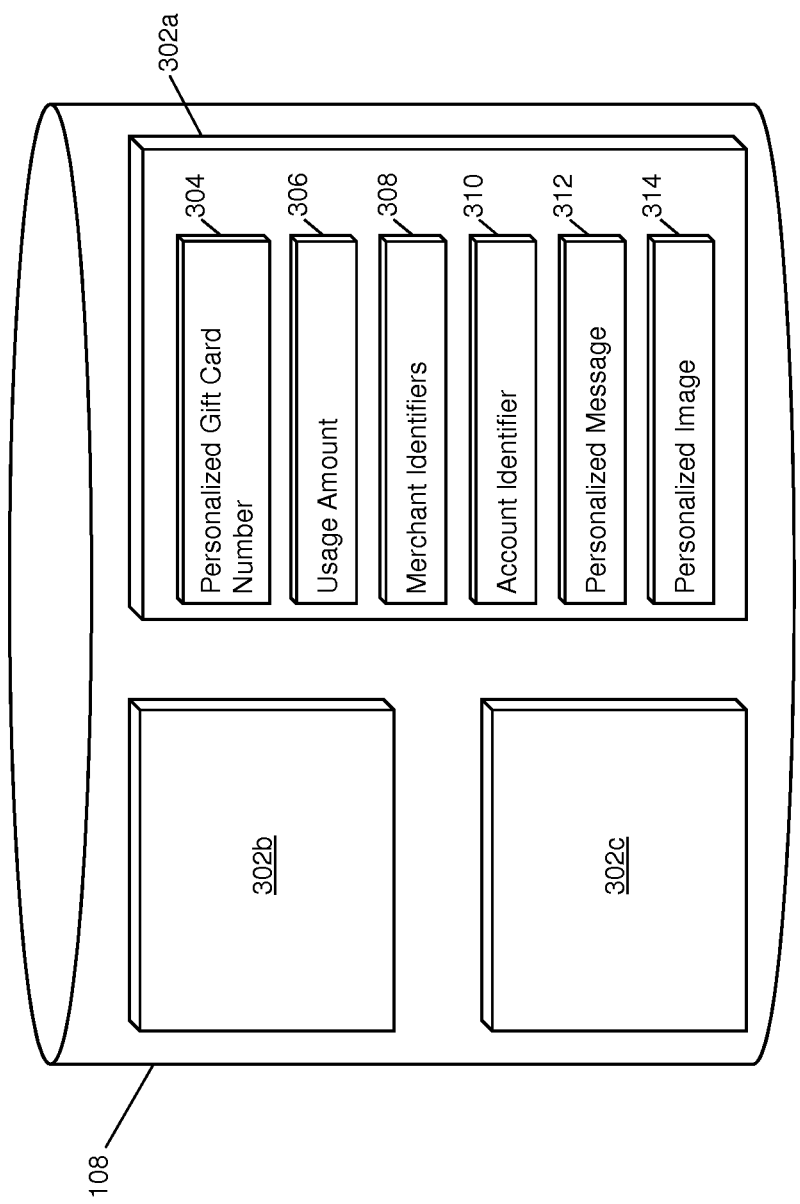
FIG. 3 is a block diagram illustrating a personalized gift card database of the processing server of FIG. 2 in accordance with exemplary embodiments.

FIG. 3 is an illustration of the personalized gift card database 108 of the processing server 106. The personalized gift card database 108 may be configured to store a plurality of gift card data entries 302, illustrated in FIG. 3 as gift card data entries 302a, 302b, and 302c. Each gift card data entry 302 may include at least a personalized gift card number 304, a usage amount 306, merchant identifiers 308, and an account identifier 310. In some embodiments a gift card data entry 302 may further include a personalized message 312 and/or at least one personalized image 314.

The personalized gift card number 304 may be a unique value associated with the gift card data entry 302. In some embodiments, the personalized gift card number 304 may be a 16-digit number, and may include properties similar to credit card or other payment card numbers, such that they may be recognized and routed by traditional point-of-sale systems similar to credit card and other payment card numbers. In an exemplary embodiment, the personalized gift card number 304 may be formatted such that it may be recognized and routed using legacy payment systems.

The usage amount 306 may be an amount representing the value of the personalized gift card. In some embodiments, a payment account associated with the consumer 102 may be deducted the usage amount 306. In other embodiments, a payment account associated with the consumer 102 may have a hold placed on the account for the usage amount 306 for a predetermined period of time, for use in funding financial transactions involving the personalized gift card up to the usage amount 306.

The merchant identifiers 308 may be a plurality of merchant identifiers corresponding to merchants (e.g., including the merchant 110) where the personalized gift card may be redeemed. Each merchant identifier may be a value suitable for identifying the merchant 110 involved in the financial transaction as a merchant selected for redemption, such as a merchant identification number (MID). In some embodiments, the merchant identifiers 308 may include at least one category identifier, which may represent a plurality of merchants included in a corresponding category of merchants, such as electronics retailers. In an exemplary embodiment, the merchant identifiers 308 may include at least two merchant identifiers identifying specific merchants.

The account identifier 310 may be a unique value corresponding to a payment account associated with the consumer 102 used for funding the personalized gift card. In embodiments where the personalized gift card may be funded (e.g., paid for) when it is created (e.g., distributed or transmitted), the gift card data entry 302 may not include the account identifier 310.

The personalized message 312 may be a message provided by the consumer 102 for display to the recipient 112 upon use of the personalized gift card. Methods for transmitting and/or displaying the personalized message 312 to the recipient will be apparent to persons having skill in the relevant art and may include printing on a receipt, e-mail, SMS message, MMS message, social media (e.g., Facebook®, Twitter®, LinkedIn®, etc.), etc.

The personalized image 314 may include at least one image selected by the consumer 102 for display on the personalized gift card. The at least one image may include icons, logos, names, etc. corresponding to at least one (e.g., or all) of the merchants corresponding to the merchant identifiers 308, images associated with an industry or industries of the merchants corresponding to the merchant identifiers 308, an image or images provided by the consumer 102, etc. For example, the consumer 102 may indicate in the personalized gift card request for the personalized gift card to include a background image of the recipient 112 and for the personalized gift card to display the logos for each merchant where the personalized gift card may be redeemed. In some embodiments, the consumer 102 may indicate where each image of the at least one image is to be displayed on the personalized gift card (e.g., the background image on the front side of the personalized gift card and the logos on the back).

Method for Distribution and Processing of Personalized Gift Cards

Figure 4A:
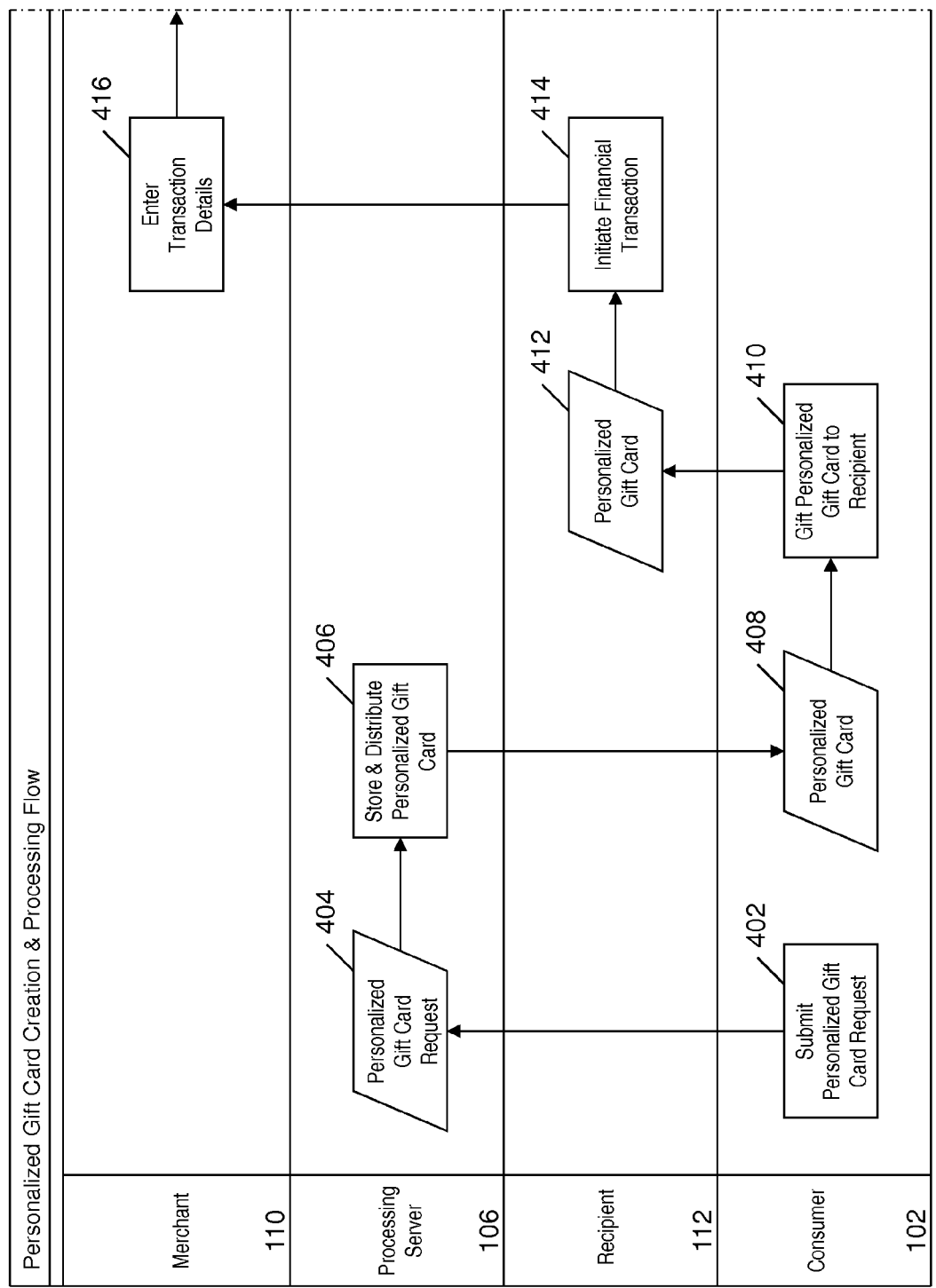
FIGS. 4A and 4B are a processing flow illustrating a method for the creation and distribution of a personalized gift card and processing of a transaction involving the personalized gift card in accordance with exemplary embodiments.
Figure 4B:
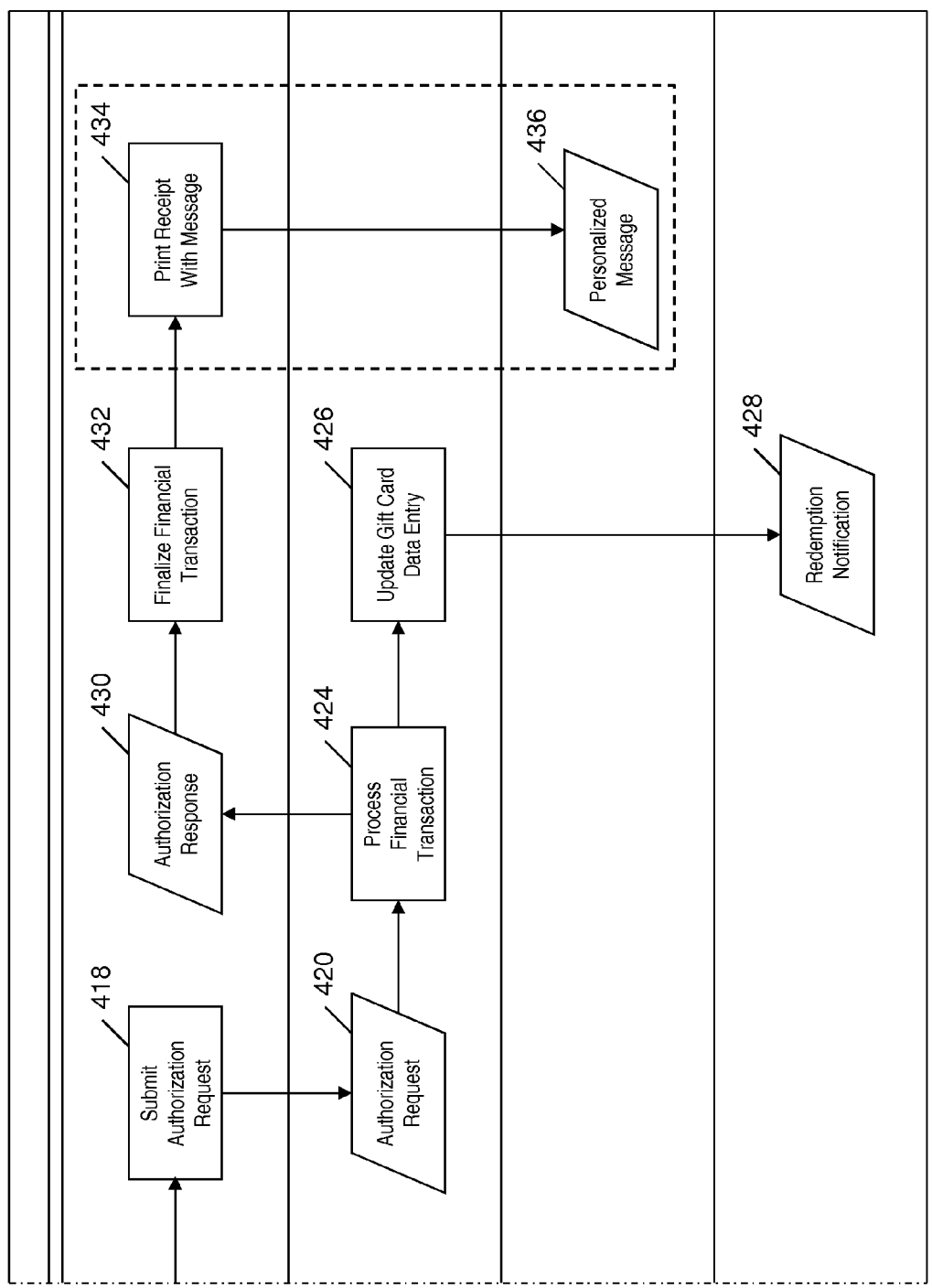

FIGS. 4A and 4B are a processing flow illustrating a method for the requesting and distribution of personalized gift cards using the system 100 and for the processing of a personalized gift card transaction.

In step 402, the consumer 102 may submit a personalized gift card request to the processing server 106, which may receive the request in step 404. The personalized gift card request may include at least a usage amount 306, a plurality of merchant identifiers 308, an account identifier 310, and a message 312 and/or at least one image 314. In step 406, the processing server 106 may identify a personalized gift card number 304 and store the data related to the personalized gift card, including the identified personalized gift card number, as a gift card data entry 302 in the personalized gift card database 108. The processing server 106 may distribute the personalized gift card (e.g., by a method and to a destination identified by the consumer 102 in the personalized gift card request) to the consumer 102 in step 408.

In some embodiments, the processing server 106 may initiate a financial transaction for the usage amount 306 of the personalized gift card to be funded by the payment account corresponding to the account identifier 310. In other embodiments, the processing server 106 may request that the issuer 104 place a hold on the corresponding payment account for the usage amount 306.

In step 408, the consumer 102 may receive the personalized gift card. In step 410, the consumer 102 may gift the personalized gift card to the recipient 112, who may receive the personalized gift card in step 412. In step 414, the recipient 112 may initiate a financial transaction with the merchant 110 for goods or services using the personalized gift card. In step 416, the merchant 110 may enter transaction details for the financial transaction into a point-of-sale system, including at least the personalized gift card number 304 for the personalized gift card.

In step 418, the merchant 110 (e.g., and/or the acquirer 114) may submit an authorization request for the financial transaction. In one embodiment the authorization request may be formatted pursuant to the International Organization for Standardization's ISO 8583 standard. In step 420, the processing server 106 (e.g., or another entity in a payment network including the processing server 106) may receive the authorization request. The authorization request may include at least the personalized gift card number 304, a transaction amount, and at least one merchant identifier (e.g., corresponding to the merchant 110) of the plurality of merchant identifiers 308.

In step 424, the processing server 106 may process the financial transaction. Methods for processing a financial transaction will be apparent to persons having skill in the relevant art. In step 426, the processing server may update the gift card data entry 302 corresponding to the personalized gift card based on the transaction amount for the financial transaction. In some instances, the process may further include step 428, where a redemption notification may be transmitted to the consumer 102, to notify the consumer 102 of redemption of the personalized gift card by the recipient 112. In one embodiment, the notification may be transmitted upon the first use of the personalized gift card. In another embodiment, the notification may be transmitted once the updated usage amount 306 is zero.

In step 430, an authorization response may be transmitted to and received by the merchant 110. The authorization response may indicate if the financial transaction is approved or denied. In some embodiments, the authorization response may further include the personalized message 312. In step 432, the merchant 110 may finalized the financial transaction, such as by providing the transacted for goods or services to the recipient 112.

In embodiments where the authorization response 430 may include the personalized message 312, in step 434 the merchant 110 may print a receipt for the financial transaction including the personalized message 312. The receipt may be furnished to the recipient 112 in step 436 to deliver the personalized message 312. It will be apparent to persons having skill in the relevant art that steps 434 and 436 may be optional. It will also be apparent to persons having skill in the relevant art that the personalized message 312 may be transmitted to the recipient by the processing server 106.

Graphical User Interface

Figures 5A, 5B:
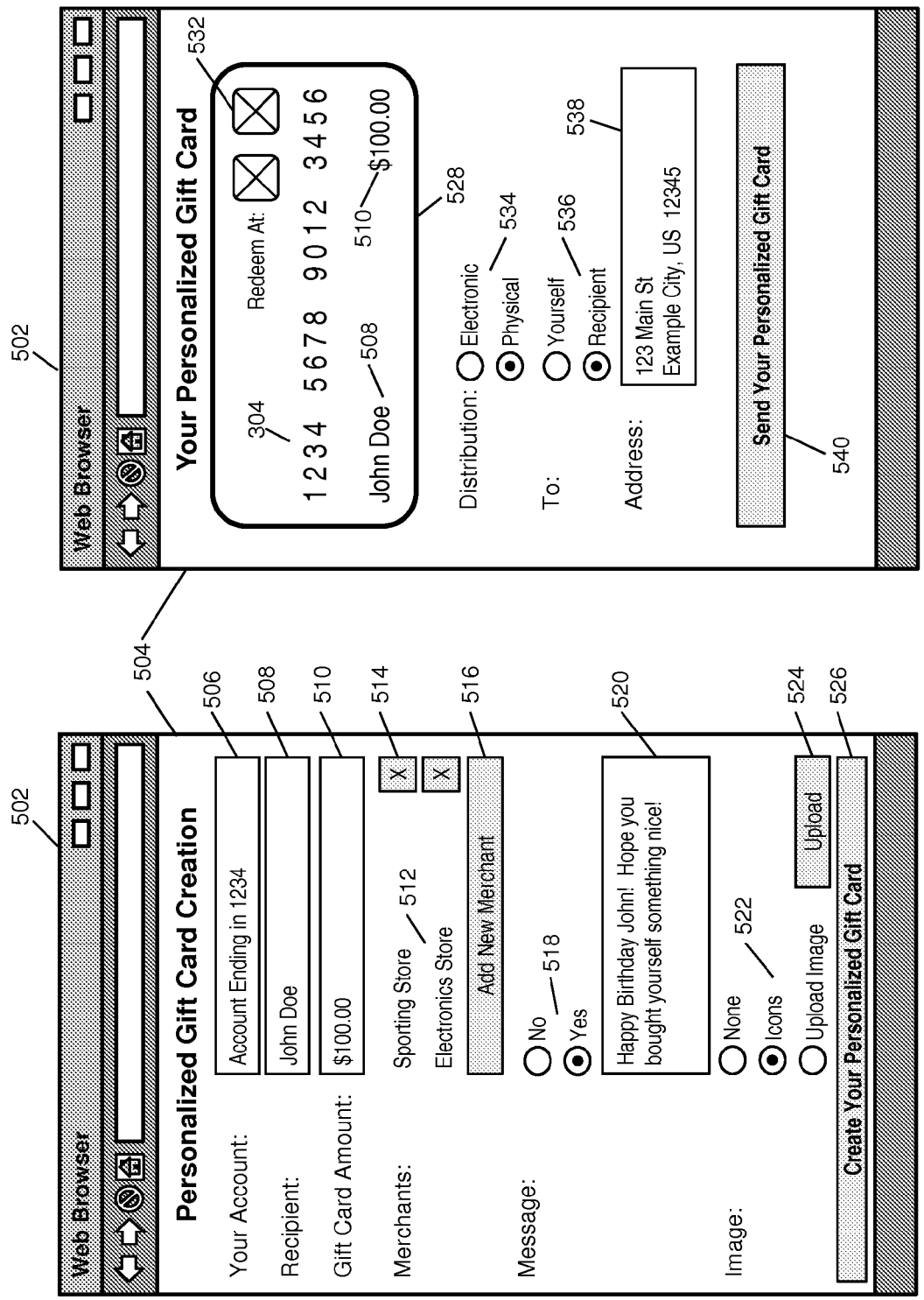
FIGS. 5A and 5B are an illustration of a graphical user interface for the creation and personalization of a personalized gift card in accordance with exemplary embodiments.

FIGS. 5A and 5B illustrate a graphical user interface for the submission of a personalized gift card request from the consumer 102 to the processing server 106. FIGS. 5A and 5B illustrate a web browser 502 displaying a web page 504. It will be apparent to persons having skill in the relevant art that the graphical user interface illustrated and discussed herein is illustrated as an example only. Additional methods for providing a graphical user interface to the consumer 102, and additional configurations of a graphical user interface, will be apparent to persons having skill in the relevant art. For example, the consumer 102 may fill out and submit a personalized gift card request via an application program on a smartphone, but other forms of electronic and paper communications are contemplated.

FIG. 5A illustrates the web browser 502, which may display the webpage 504 when accessed by the web browser 502 navigating to an address corresponding to the webpage 504. The webpage 504 may be hosted by the processing server 106 or by another entity (e.g., a web hosting server) on behalf of the processing server 106. The webpage 504 may include an account field 506. The account field 506 may indicate the payment account associated with the consumer 102 to be used to fund the personalized gift card. The webpage 504 may also include a recipient field 508. The consumer 102 may fill out the recipient field 508 with the name of the recipient 112 for whom the personalized gift card is intended, by typing it in, by accessing an electronic address book or via social media.

The webpage 504 may further include an amount field 510. The amount field 510 may be edited by the consumer 102 to select the usage amount 306 for the personalized gift card. In some embodiments, the amount field 510 may be a text box. In other embodiments, the amount field 510 may include a drop-down box, radio buttons, etc. for selecting the usage amount 306. The webpage 504 may also include a merchant listing 512. The merchant listing 512 may be a list of all merchants selected where the personalized gift card may be eligible for redemption. Each merchant in the merchant listing 512 may have a corresponding remove button 514 such that the consumer 102 may interact with the remove button 514 to remove the corresponding merchant from the merchant listing 512.

The merchant listing 512 may also include an add-merchant button 516. When interacting with the add-merchant button 516, the consumer 102 may be presented with a new page, window, pop-up, etc. for the selection of a merchant to add to the merchant listing 512. In some embodiments, the consumer 102 may select from eligible merchants via a drop-down menu, a list, by typing a merchant name, or any other suitable method for selecting a merchant as will be apparent to persons having skill in the relevant art.

The webpage 504 may also include a message selector 518. The message selector 518 may include two radio buttons for the consumer 102 to select if the recipient 112 is to be provided with a personalized message. The consumer 102 may type a personalized message into message field 520 for display to the recipient 112. In some embodiments, the consumer 102 may further select method of transmission of the message to the recipient (e.g., display on receipt, SMS message, etc.) and/or when the message is to be transmitted (e.g., upon first redemption using the personalized gift card).

The webpage 504 may further include an image selector 522. The image selector 522 may include radio buttons for selecting the at least one personalized image 314 to be displayed on the personalized gift card. The image selector 522 may include, for example, a selector for no personalized image, a selector for icons corresponding to the merchants in the merchant listing 512, and a selector for the consumer 102 to provide their own image, which may be provided by the consumer 102 interacting with an upload button 524. The upload button 524 may display a prompt for the consumer 102 to select an image from their computing device, network, a social network (e.g., Facebook®), a library of images (e.g., hosted by the web hosting server or the processing server 106), etc.

The webpage 504 may also include a create button 526. When the consumer 102 interacts with the create button 526, the user may be presented with the confirmation webpage 504 illustrated in FIG. 5B. In some embodiments, the processing server 106 may initiate a transaction to fund the personalized gift card prior to completion of the page illustrated in FIG. 5B. In other embodiments, the processing server 106 may wait to create a gift card data entry 302 and fund the personalized gift card until completion of the webpage 504 of FIG. 5B.

As illustrated in FIG. 5B, the webpage 504 may display an image 528 of the personalized gift card based on the provided information. In some instances, the image 528 may be the electronic personalized gift card that may be distributed to the recipient 112 by the processing server 106 and/or the consumer 102. The image 528 may include the recipient 508 and usage amount 510 as provided by the consumer 102. The image 528 may also include the personalized gift card number 304. In some embodiments, the personalized gift card number 304 may be modified such as to protect the personalized gift card number. For example, only the last four digits of the personalized gift card number 304 may be displayed.

The image 528 may also display icons 532. The icons 532 may correspond to each merchant of the merchant listing 512 and may have been indicated for display based on the image selector 522. In some embodiments, the consumer 102 may be able to select additional configurations for display of the icons 532. For example, the consumer 102 may select the orientation or location of the icons 532 on the image 528 and/or on a physical personalized gift card.

The webpage 504 may further include a distribution selector 534. The distribution selector 534 may enable the consumer 102 to select if the personalized gift card should be distributed as an electronic gift card or a physical gift card. The consumer 102 may also select from a destination selector 536, which may enable the consumer 102 to select if the personalized gift card should be distributed directly to the consumer 102 (e.g., for gifting to the recipient 112) or directly to the recipient 112. The webpage 504 may also include an address field 538, where the consumer 102 may input a destination address for the personalized gift card. It will be apparent to persons having skill in the relevant art that the address field 538 may change depending on the distribution selector 534 and/or the destination selector 536. For example, the address field 538 may request a mailing address for a physical personalized gift card or an e-mail address for an electronic personalized gift card.

The webpage 504 may also include a send button 540. The send button 540, when interacted with by the consumer 102, may initiate processing of the creation and distribution of the personalized gift card as discussed in more detail above. For example, as illustrated in FIG. 5B, when the consumer interacts with the send button 540, the processing server 106 may create a physical personalized gift card displaying the icons 532, which may be distributed (e.g., via the distributing unit 208) directly to the recipient 112 via the address provided in the address field 538.

In some embodiments, the consumer 102 may provide settings (e.g., criteria,etc.) to automate the process. For example, the personalized gift cards may be automatically created upon special events (e.g., birthdays, graduations, anniversaries achieving other goals or milestones) for individuals or groups of individuals. In some instances, the consumer 102 may preselect the customization (e.g., the merchants, usage amount, etc.). In other instances, the consumer 102 may have the customization automatically selected based on the recipient's 112 interests. For example, the recipient 112 may provide their interests to the processing server 106 (e.g., via the application program or webpage) or their interests may be data-mined by suitable data-mining programs or techniques, such as might be used for targeted marketing (see, e.g., U.S. patent application Ser. No. 13/757,878, in the name of Caglayan et al. entitled "Method and System of Customer Level Transaction Analytics Across Merchant Sites", herein incorporated by reference in its entirety). In a further example, interests of the recipient 112 may be obtained via at least one or more social networks (e.g., Facebook®, Twitter®, etc.), and/or based on financial transaction history at the consent of the recipient 112 (e.g., highlighting the most commonly visited merchants, etc.).

Merchants 110 may provide consideration to the entity running the processing server 106 to have their customization (e.g., selection of it one of the specific merchants in the customization of the gift card over other suitable merchants), when the customization is automated. This automated approach might be of particular interest to individuals or companies that wish to give or reward a group of friends, business colleagues or employees or other groups periodically, e.g., provide a customized gift card to an employee reaching a milestone, e.g., a specific number of years in service, etc. An optional notification may be sent to the consumer 102 (e.g., a supervisor) or the like with particulars about the content of the gift card (e.g., amount and customization details, for instance). Additional instances where automation may be useful and additional methods for automatic configuration of personalized gift cards will be apparent to persons having ordinary skill in the relevant art.

First Exemplary Method for Processing a Personalized Gift Card Transaction

Figure 6:
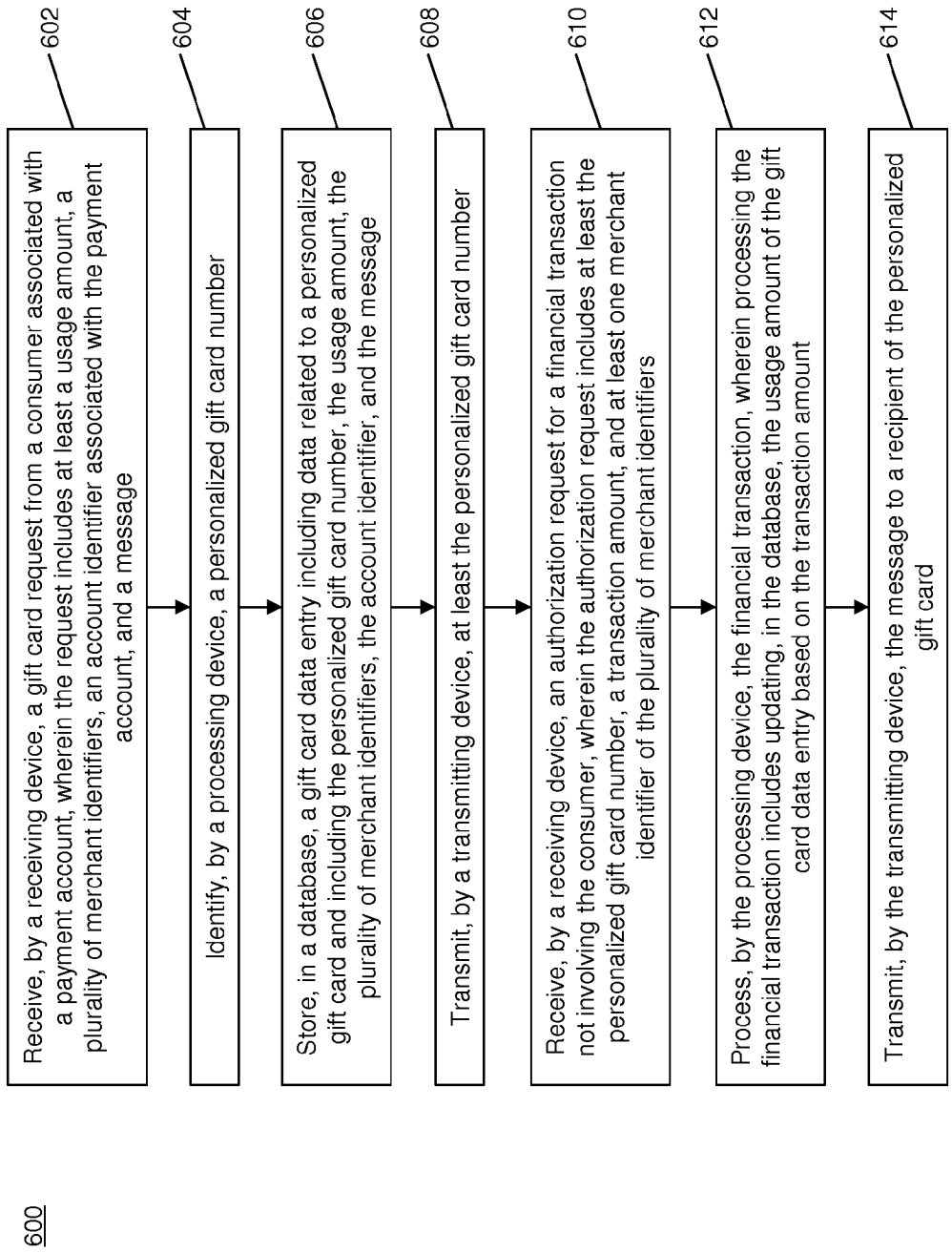
FIGS. 6 and 7 are flow charts illustrating exemplary methods for processing a personalized gift card transaction in accordance with exemplary embodiments.

FIG. 6 illustrates a method 600 for processing a personalized gift card transaction using the system 100.

In step 602, a receiving device (e.g., the receiving unit 202) may receive a gift card request from a consumer (e.g., the consumer 102) associated with a payment account, wherein the request includes at least a usage amount (e.g., the usage amount 306), a plurality of merchant identifiers (e.g., the merchant identifiers 308), an account identifier (e.g., the account identifier 310) associated with the payment account, and a message (e.g., the personalized message 312). In one embodiment, a hold may be placed on the payment account for the usage amount 306.

In step 604, a personalized gift card number (e.g., the personalized gift card number 304) may be identified by a processing device (e.g., the processing unit 206). In step 606, a gift card data entry (e.g., the gift card data entry 302) may be stored in a database (e.g., the personalized gift card database 108), the gift card data entry 302 including data related to a personalized gift card and including the personalized gift card number 304, the usage amount 306, the plurality of merchant identifiers 308, the account identifier 310, and the message 312. In one embodiment personalized gift card may be one of an electronic gift card and a physical card.

In step 608, a transmitting device (e.g., the transmitting unit 204) may transmit at least the personalized gift card number 304. In some embodiments, the gift card request may further include recipient contact information, and the personalized gift card number 304 may be transmitted to a recipient (e.g., the recipient 112) based on the recipient contact information. In step 610, an authorization request for a financial transaction not involving the consumer 102 may be received, by the receiving device 202, wherein the authorization request includes at least the personalized gift card number 304, a transaction amount, and at least one merchant identifier of the plurality of merchant identifiers 308.

In step 612, the financial transaction may be processed, by the processing device 206, wherein processing the financial transaction includes updating, in the database 108, the usage amount 306 of the gift card data entry 302 based on the transaction amount. In step 614, the message 312 may be transmitted, by the transmitting device 204, to a recipient (e.g., the recipient 112) of the personalized gift card. In one embodiment, transmitting the message 312 to the recipient 112 may include transmitting the message 312 to a merchant (e.g., the merchant 110) involved in the financial transaction for display of the message 312 on a receipt for the financial transaction. In some embodiments, the gift card request may further include recipient contact information, and the message 312 may be transmitted to the recipient 112 based on the recipient contact information.

Second Exemplary Method for Processing a Personalized Gift Card Transaction

Figure 7:
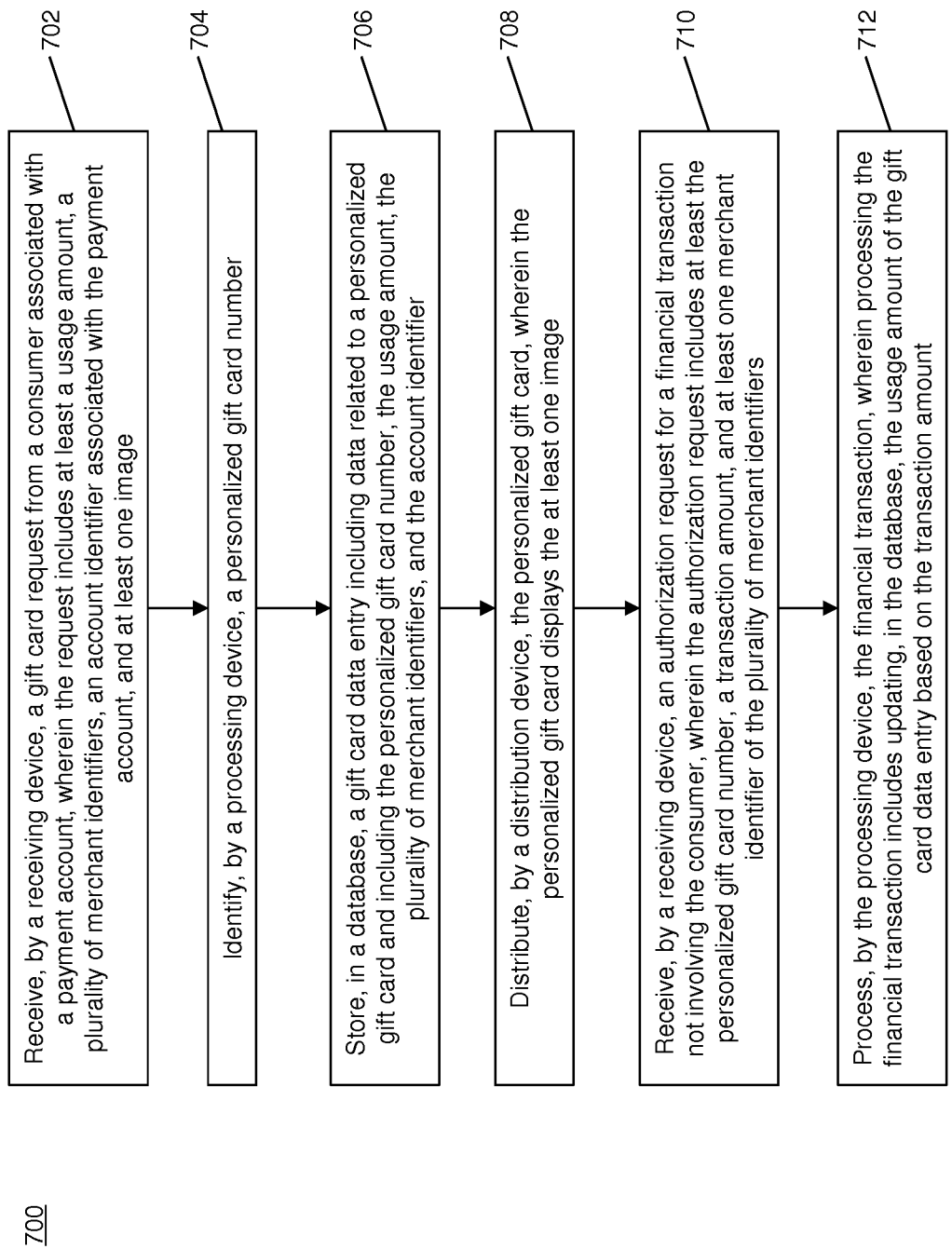

FIG. 7 illustrates a method 700 for processing a personalized gift card transaction using the system 100.

In step 702, a receiving device (e.g., the receiving unit 202) may receive a gift card request from a consumer (e.g., the consumer 102) associated with a payment account, wherein the request includes at least a usage amount (e.g., the usage amount 306), a plurality of merchant identifiers (e.g., the merchant identifiers 308), an account identifier (e.g., the account identifier 310) associated with the payment account, and at least one image (e.g., the personalized image 314). In one embodiment, a hold may be placed on the payment account for the usage amount 306.

In some embodiments, the at least one image may be associated with at least one merchant identifier of the plurality of merchant identifiers 308. In a further embodiment, the at least one image may be one of: an icon, image, logo, and name. In another embodiment, the at least one image may include at least one image associated with each merchant identifier of the plurality of merchant identifiers 308. In a further embodiment, each of the at least one image associated with each merchant identifier may be a logo associated with the merchant identifier.

In step 704, a personalized gift card number (e.g., the personalized gift card number 304) may be identified by a processing device (e.g., the processing unit 206). In step 706, a gift card data entry (e.g., the gift card data entry 302) may be stored in a database (e.g., the personalized gift card database 108), the gift card data entry 302 including data related to a personalized gift card and including the personalized gift card number 304, the usage amount 306, the plurality of merchant identifiers 308, the account identifier 310, and the at least one image 314. In one embodiment personalized gift card may be a physical card. In another embodiment, the personalized gift card may be an electronic gift card and the at least one image 314 may be displayed in a graphic illustration of the electronic gift card.

In step 708, a distribution device (e.g., the distributing unit 208) may distribute the personalized gift card, wherein the personalized gift card displays the at least one image 314. In some embodiments, the gift card request may further include recipient contact information, and the personalized gift card number 304 may be distributed to a recipient (e.g., the recipient 112) other than the consumer based on the recipient contact information.

In step 710, an authorization request for a financial transaction not involving the consumer 102 may be received, by the receiving device 202, wherein the authorization request includes at least the personalized gift card number 304, a transaction amount, and at least one merchant identifier of the plurality of merchant identifiers 308. In step 712, the financial transaction may be processed, by the processing device 206, wherein processing the financial transaction includes updating, in the database 108, the usage amount 306 of the gift card data entry 302 based on the transaction amount.

Computer System Architecture

FIG. 8 illustrates a computer system 800 in which embodiments of the present disclosure, or portions thereof, may be implemented as computer-readable code. For example, the issuer 104, the processing server 106, the merchant 110, and the acquirer 114 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A, 4B, 6, and 7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. The processor device 804 may be connected to a communication infrastructure 806, such as a bus, message queue, network (e.g., the network 116), multi-core message-passing scheme, etc. The network 116 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive, the removable storage unit 818 may be a floppy disk. In one embodiment, the removable storage unit 818 may be non-transitory computer readable recording media.

In some embodiments, the secondary memory 88 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

Computer program medium and computer usable medium may refer to memories, such as the main memory 808 and secondary memory 88, which may be memory semiconductors (e.g. DRAMs, etc.). These computer program products may be means for providing software to the computer system 800. Computer programs (e.g., computer control logic) may be stored in the main memory 808 and/or the secondary memory 88. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4A, 4B, 6, and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

Techniques consistent with the present disclosure provide, among other features, systems and methods for the processing of personalized gift card transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for processing a personalized gift card transaction, comprising:

receiving, by a receiving device of a processing server, an electronic request for a personalized gift card from at least one of (i) an application program installed on a communication device of a consumer and (ii) a web page, wherein the electronic request includes at least a usage amount, a plurality of merchant identifiers identified for redemption, an account identifier associated with a payment account for funding at least the usage amount, and a message for electronic transmission;

identifying, by a processing device of the processing server, a personalized gift card number;

electronically storing, in a database device of the processing server, a gift card data entry including data related to the personalized gift card and including the personalized gift card number stored in association with the usage amount, the plurality of merchant identifiers identified for redemption, the account identifier, and the message received in the electronic request for the personalized gift card;

transmitting, by a transmitting device of the processing server, at least the personalized gift card number;

receiving, by the receiving device of the processing server, via a computer network, an electronic authorization request from a merchant point-of-sale (POS) device for a financial transaction associated with redemption of the personalized gift card number by the recipient of the personalized gift card, wherein the electronic authorization request includes at least the personalized gift card number, a transaction amount, and a merchant identifier associated with a merchant of the POS device from which the electronic authorization request is received;

determining, by the processing device of the processing server, whether the merchant identifier included in the electronic authorization request from the merchant POS device corresponds to one of the plurality of merchant identifiers stored in association with the personalized gift card number in the gift card data entry, in the database device of the processing server;

when it is determined that the merchant identifier included in the electronic authorization request from the merchant corresponds to one of the plurality of merchant identifiers stored in association with the personalized gift card number in the gift card data entry, in the database device of the processing server, processing, by the processing device of the processing server, the financial transaction, wherein processing the financial transaction includes updating, in the database device of the processing server, the usage amount of the gift card data entry based on the transaction amount; and upon the processing of the financial transaction, electronically transmitting, by the transmitting device of the processing server, the message to at least one of the merchant and a communication device of the recipient of the personalized gift card, wherein said transmission to said at least one of said merchant and said communication device of the recipient causes display of said message.

2. The method of claim 1, wherein when the message is transmitted to the merchant, the message is displayed on a receipt for the financial transaction.

3. The method of claim 1, wherein the electronic personalized gift card request further includes recipient contact information, and when the message is electronically transmitted to the communication device of the recipient, the transmission is based on the recipient contact information.

4. The method of claim 1, wherein the electronic personalized gift card request further includes recipient contact information, and transmitting the personalized gift card number includes transmitting the personalized gift card number to a communication device of the recipient based on the recipient contact information.

5. The method of claim 1, wherein the personalized gift card is one of: an electronic gift card and a physical card.

6. The method of claim 1, further comprising:

placing a hold on the payment account for the usage amount.

7. A computer-implemented method for processing a personalized gift card transaction, comprising:

receiving, by a receiving device of a processing server, an electronic request for a personalized gift card for a recipient, said electronic request being received from at least one of (i) an application program installed on a communication device of a consumer and (ii) a web page, wherein the electronic request includes at least a usage amount, a plurality of merchant identifiers identified for redemption, an account identifier associated with a payment account for funding at least the usage amount, and at least one image for display upon a personalized gift card;

identifying, by a processing device of the processing server, a personalized gift card number;

electronically storing, in a database device of the processing server, a gift card data entry including data related to the personalized gift card and including the personalized gift card number stored in association with the usage amount, the plurality of merchant identifiers identified for redemption, the account identifier and the at least one image received in the electronic request for the personalized gift card;

distributing, by a distribution device of the processing server, the personalized gift card, wherein the personalized gift card displays the at least one image;

receiving, by the receiving device of the processing server, via a computer network, an electronic authorization request from a merchant point-of-sale (POS) device for a financial transaction associated with redemption of the personalized gift card number by the recipient of the personalized gift card number, wherein the electronic authorization request includes at least the personalized gift card number, a transaction amount, and a merchant identifier associated with a merchant of the POS device from which the electronic authorization request is received;

determining, by the processing device of the processing server, whether the merchant identifier included in the electronic authorization request from the merchant corresponds to one of the plurality of merchant identifiers stored in association with the personalized gift card number in the gift card data entry, in the database of the processing server;

when it is determined that the merchant identifier included in the electronic authorization request from the merchant POS device corresponds to one of the plurality of merchant identifiers stored in association with the personalized gift card number in the gift card data entry, in the database device of the processing server, processing, by the processing device of the processing server, the financial transaction, wherein processing the financial transaction includes updating, in the database device of the processing server, the usage amount of the gift card data entry based on the transaction amount.

8. The method of claim 7, wherein the at least one image is associated with at least one merchant identifier of the plurality of merchant identifiers.

9. The method of claim 8, wherein the at least one image is one of: an icon, image, logo, and name.

10. The method of claim 7, wherein the at least one image includes at least one image associated with each merchant identifier of the plurality of merchant identifiers.

11. The method of claim 10, wherein each of the at least one image associated with each merchant identifier is a logo associated with the merchant identifier.

12. The method of claim 7, wherein
the electronic personalized gift card request further includes recipient contact information, and
distributing the personalized gift card includes distributing the personalized gift card to the recipient based on the recipient contact information.

13. The method of claim 7, wherein the personalized gift card is a physical card.

14. The method of claim 7, wherein the personalized gift card is an electronic gift card, and the at least one image is displayed in a graphic illustration of the electronic gift card.

15. The method of claim 7, further comprising:
placing a hold on the payment account for the usage amount.

16. A processing system for processing a personalized gift card transaction, comprising:
a receiving device, of the processing system, configured to receive an electronic request for a personalized gift card from at least one of (i) an application program installed on a communication device of a consumer and (ii) a web page, wherein the electronic request includes at least a usage amount, a plurality of merchant identifiers identified for redemption, an account identifier associated with a payment account for funding at least the usage amount, and a message for electronic transmission;

a processing device, of the processing system, configured to identify a personalized gift card number;

a database device, of the processing system, configured to store a gift card data entry including data related to the personalized gift card and including the personalized gift card number stored in association with the usage amount, the plurality of merchant identifiers identified for redemption, the account identifier, and the message received in the electronic request for the personalized gift card; and a transmitting device, of the processing system, configured to transmit at least the personalized gift card number, wherein
the receiving device, of the processing system, is further configured to receive, via computer network, an electronic authorization request from a merchant point-of-sale (POS) device for a financial transaction associated with redemption of the personalized gift card number by the recipient of the personalized gift card number, wherein the electronic authorization request includes at least the personalized gift card number, a transaction amount, and a merchant identifier associated with a merchant of the POS device from which the electronic authorization request is received,
the processing device is further configured to (i) determine whether the merchant identifier included in the electronic authorization request from the merchant POS device corresponds to one of the plurality of merchant identifiers stored in association with the personalized gift card number in the gift card data entry, in the database device of the processing system, (ii) process the financial transaction when it is determined that the merchant identifier included in the electronic authorization request from the merchant POS device corresponds to one of the plurality of merchant identifiers stored in association with the personalized gift card number in the gift card data entry, in the database device of the processing system, wherein processing the financial transaction includes updating, in the database device, the usage amount of the gift card data entry based on the transaction amount, and
the transmitting device, of the processing system is further configured to electronically transmit, upon the processing of the financial transaction, the message to at least one of the merchant and a communication device of the recipient of the personalized gift card, wherein said transmission to said at least one of said merchant and said communication device of the recipient causes display of said message.

17. The system of claim 16, wherein when the message is transmitted to the merchant, the message is displayed on a receipt for the financial transaction.

18. The system of claim 16, wherein the electronic personalized gift card request further includes recipient contact information, and when the message is electronically transmitted to the communication device of the recipient, the transmission is based on the recipient contact information.

19. The system of claim 16, wherein the electronic personalized gift card request further includes recipient contact information, and the transmitting device is configured to electronically transmit the personalized gift card number to the communication device recipient based on the recipient contact information.

20. The system of claim 16, wherein the personalized gift card is one of: an electronic gift card and a physical card.

21. The system of claim 16, wherein the processing device is further configured to place a hold on the payment account for the usage amount.

22. A processing system for processing a personalized gift card transaction, comprising:
   a receiving device, of the processing system, configured to receive an electronic request for a personalized gift card for a recipient, said electronic request being received from at least one of (i) an application program installed on a communication device of a consumer and (ii) a webpage, wherein the electronic request includes at least a usage amount, a plurality of merchant identifiers identified for redemption, an account identifier associated with a payment account for funding at least the usage amount, and at least one image for display upon a personalized gift card;
   a processing device, of the processing system, configured to identify a personalized gift card number;
   a database device, of the processing system, configured to electronically store a gift card data entry including data related to the personalized gift card and including the personalized gift card number stored in association with the usage amount, the plurality of merchant identifiers identified for redemption, the account identifier and the at least one image received in the electronic request for the personalized gift card; and
   a distribution device, of the processing system, configured to distribute the personalized gift card, wherein the personalized gift card displays the at least one image, wherein
      the receiving device, of the processing system, is further configured to receive, via a computer network, an electronic authorization request from a merchant point-of-sale device for a financial transaction associated with redemption of the personalized gift card number by the recipient of the personalized gift card number, wherein the electronic authorization request includes at least the personalized gift card number, a transaction amount, and a merchant identifier associated with a merchant of the POS device from which the electronic authorization request is received, and
      the processing device is further configured to (i) determine whether the merchant identifier included in the electronic authorization request from the merchant POS device corresponds to one of the plurality of merchant identifiers stored in association with the personalized gift card number in the gift card data entry, in the database device of the processing system, and (ii) process the financial transaction when it is determined that the merchant identifier included in the electronic authorization request from the merchant POS device corresponds to one of the plurality of merchant identifiers stored in association with the personalized gift card number in the gift card data entry, in the database device of the processing system, wherein processing the financial transaction includes updating, in the database device, the usage amount of the gift card data entry based on the transaction amount.

23. The system of claim 22, wherein the at least one image is associated with at least one merchant identifier of the plurality of merchant identifiers.

24. The system of claim 23, wherein the at least one image is one of: an icon, image, logo, and name.

25. The system of claim 22, wherein the at least one image includes at least one image associated with each merchant identifier of the plurality of merchant identifiers.

26. The system of claim 25, wherein each of the at least one image associated with each merchant identifier is a logo associated with the merchant identifier.

27. The system of claim 22, wherein
   the electronic personalized gift card request further includes recipient contact information, and
   the distributing device is configured to distribute the personalized gift card to the recipient based on the recipient contact information.

28. The system of claim 22, wherein the personalized gift card is a physical card.

29. The system of claim 22, wherein
   the personalized gift card is an electronic gift card, and
   the at least one image is displayed in a graphic illustration of the electronic gift card.

30. The system of claim 22, wherein the processing device is further configured to place a hold on the payment account for the usage amount.

* * * * *